(12) United States Patent
Saito et al.

(10) Patent No.: US 8,971,393 B2
(45) Date of Patent: Mar. 3, 2015

(54) ENCODER

(75) Inventors: Makoto Saito, Osaka (JP); Kazuhiro Saito, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 659 days.

(21) Appl. No.: 13/121,248

(22) PCT Filed: Mar. 18, 2009

(86) PCT No.: PCT/JP2009/055294
§ 371 (c)(1),
(2), (4) Date: Mar. 28, 2011

(87) PCT Pub. No.: WO2010/035529
PCT Pub. Date: Apr. 1, 2010

(65) Prior Publication Data
US 2011/0182343 A1    Jul. 28, 2011

(30) Foreign Application Priority Data

Sep. 29, 2008 (JP) ................................. 2008-250195

(51) Int. Cl.
| | | |
|---|---|---|
| *H04N 7/64* | (2006.01) | |
| *H04N 19/177* | (2014.01) | |
| *H04N 19/61* | (2014.01) | |
| *H04N 19/124* | (2014.01) | |
| *H04N 19/154* | (2014.01) | |

(52) U.S. Cl.
CPC ............. *H04N 19/177* (2014.01); *H04N 19/61* (2014.01); *H04N 19/124* (2014.01); *H04N 19/154* (2014.01)
USPC ....................................................... 375/224

(58) Field of Classification Search
CPC combination set(s) only.
See application file for complete search history.

(56) References Cited

U.S. PATENT DOCUMENTS 6,111,990 A * 8/2000 Sugaya et al. ................ 382/250
6,590,936 B1 * 7/2003 Kadono .................... 375/240.12
6,823,074 B1 * 11/2004 Sugaya et al. ................ 382/100

(Continued)

FOREIGN PATENT DOCUMENTS

| JP | 7 107473 | 4/1995 |
|---|---|---|
| JP | 2001 119304 | 4/2001 |

(Continued)

OTHER PUBLICATIONS

International Search Report issued Jun. 23, 2009 in PCT/JP09/55294 filed Mar. 18, 2009.

*Primary Examiner* — Dave Czekaj
*Assistant Examiner* — Kehinde O Abimbola
(74) *Attorney, Agent, or Firm* — Oblon, McClelland, Maier & Neustadt, L.L.P.

(57) ABSTRACT

An average quantization error value of each of I, P, and B pictures in an encoded unit of processing is calculated as an actually measured value having a large variation. An average quantization error value of each of I, P, and B pictures in an uncoded unit of processing is set as a target value having a small variation. In the encoding of the uncoded unit of processing, a result of the encoding of the encoded unit of processing is referenced and fed back thereto. By uniformly setting respective quantization errors of images and further by uniformly setting the respective qualities of the images, the image quality of a whole stream can be subjectively improved. Since the prefetch of the uncoded unit of processing is not needed, it is possible to perform real-time processing without any increase in the circuit scale.

10 Claims, 9 Drawing Sheets

(56) References Cited

U.S. PATENT DOCUMENTS

| | | | |
|---|---|---|---|
| 7,436,890 B2* | 10/2008 | Takagi et al. | 375/240.04 |
| 7,466,454 B2* | 12/2008 | Minamino | 358/3.03 |
| 8,214,207 B2* | 7/2012 | You | 704/230 |
| 2004/0013196 A1* | 1/2004 | Takagi et al. | 375/240.05 |
| 2005/0147162 A1* | 7/2005 | Mihara | 375/240.03 |
| 2006/0017978 A1* | 1/2006 | Minamino | 358/3.03 |
| 2006/0061795 A1* | 3/2006 | Walmsley | 358/1.14 |
| 2007/0230571 A1* | 10/2007 | Kodama | 375/240.12 |
| 2011/0307261 A1* | 12/2011 | You | 704/500 |

FOREIGN PATENT DOCUMENTS

| | | |
|---|---|---|
| JP | 2002 125235 | 4/2002 |
| JP | 2003 230149 | 8/2003 |
| JP | 2006 279513 | 10/2006 |

* cited by examiner

Fig. 2

(a) INPUT IMAGE A

| A1 | A2 | A3 | A4 |
|---|---|---|---|
| A5 | A6 | A7 | A8 |
| A9 | A10 | A11 | A12 |
| A13 | A14 | A15 | A16 |

(b) DECODED IMAGE B

| B1 | B2 | B3 | B4 |
|---|---|---|---|
| B5 | B6 | B7 | B8 |
| B9 | B10 | B11 | B12 |
| B13 | B14 | B15 | B16 |

(c) QUANTIZATION ERROR $$Diff = \sum_{N=1}^{16} |AN - BN|$$
or
$$Diff = \sum_{N=1}^{16} (AN - BN)^2$$

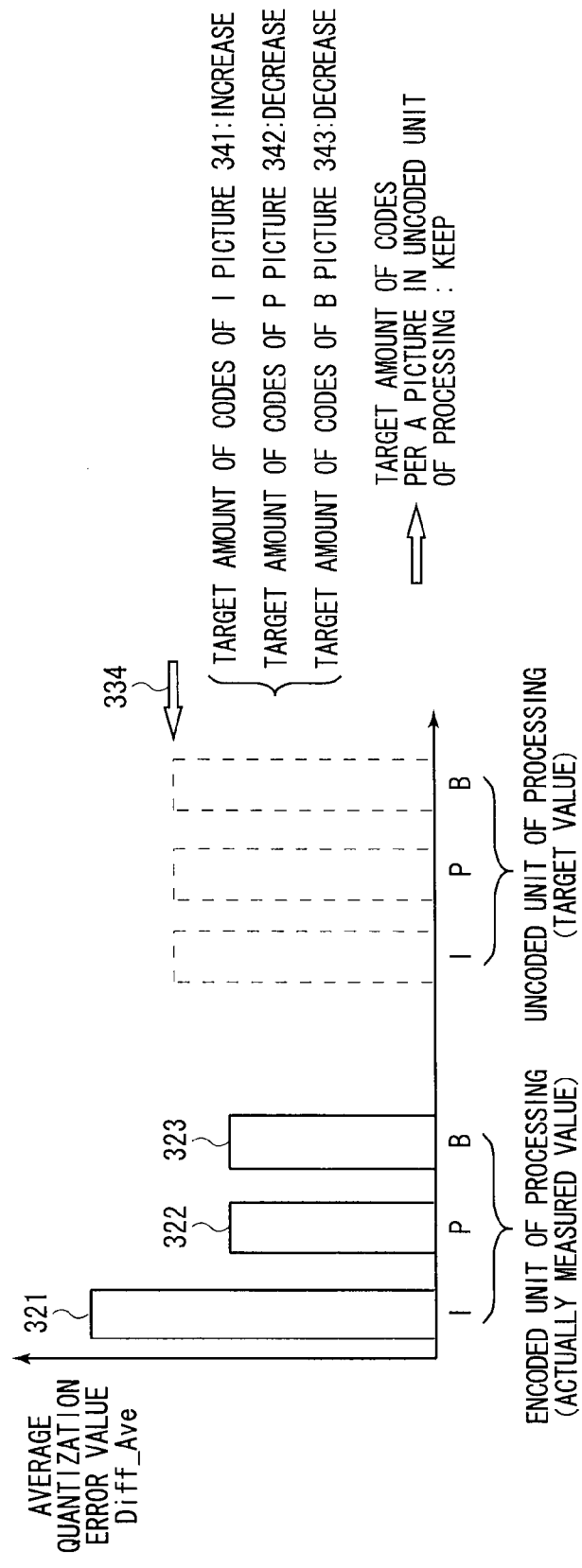

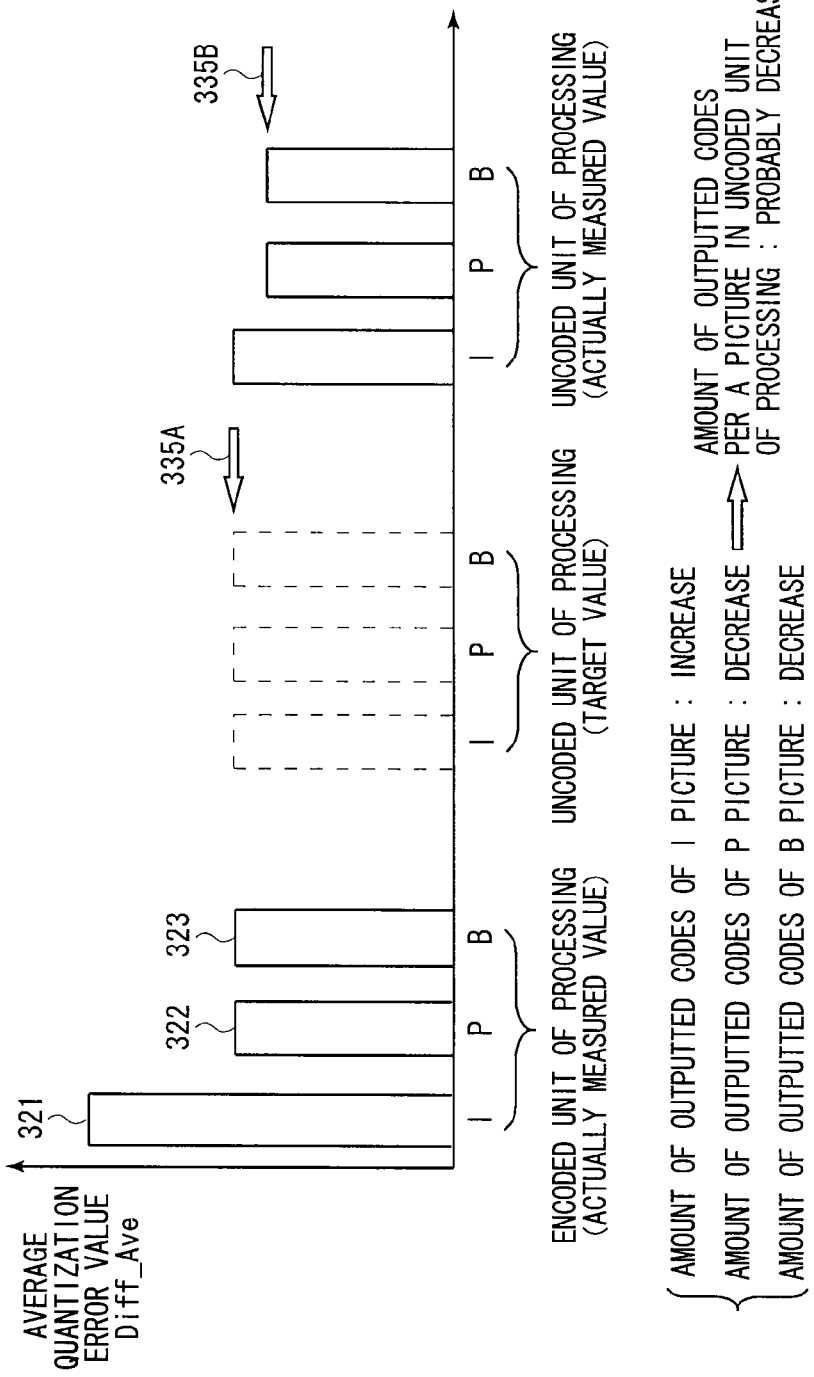

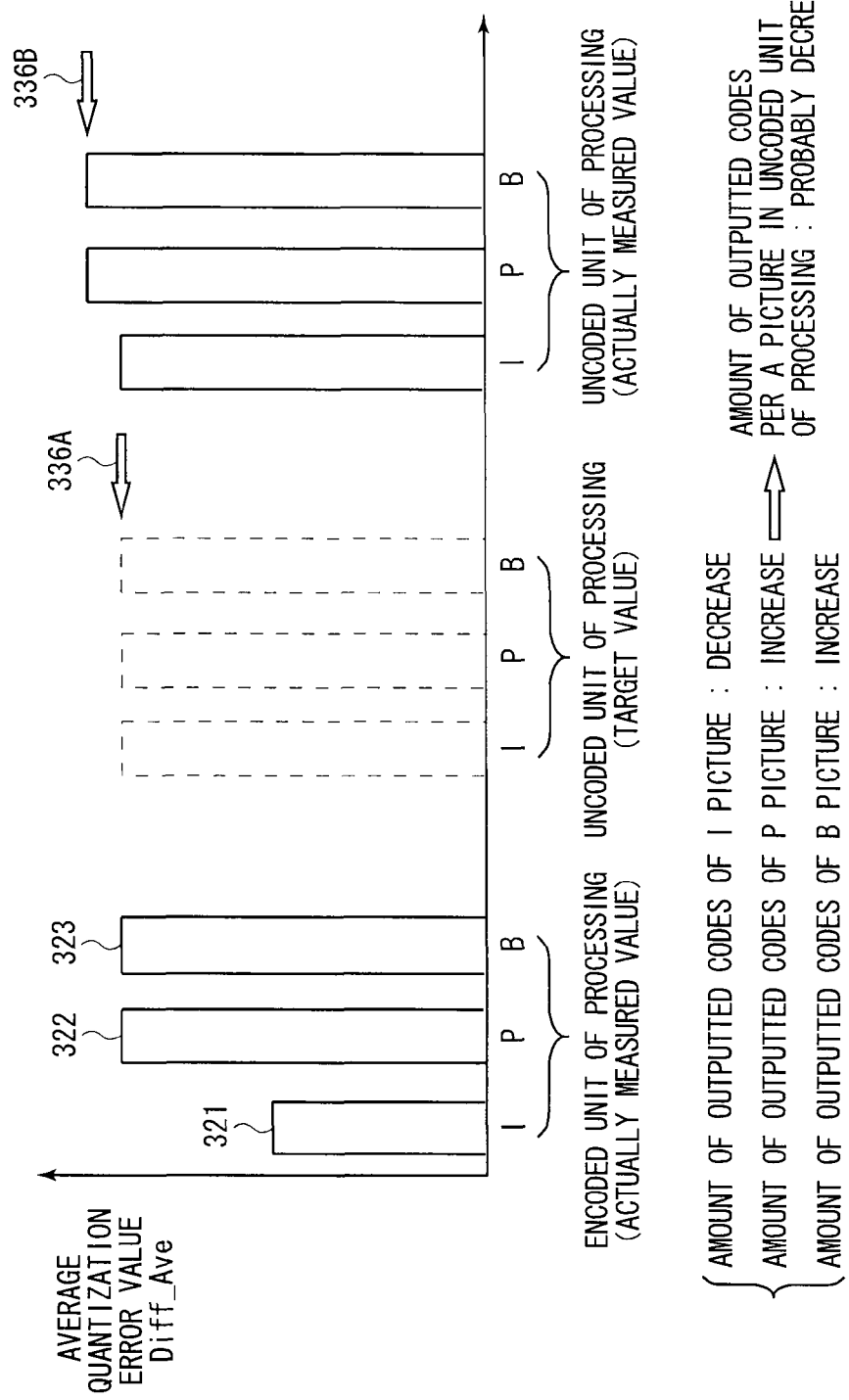

ENCODER

TECHNICAL FIELD

The present invention relates to a technique for subjectively improving the image quality of a whole stream by uniformly setting the respective qualities of images in an encoder for encoding an input image into an output image.

BACKGROUND ART

An encoder encodes an input image into an output image to compress the input image having a large data volume into the output image having a small data volume. The encoder generates a prediction image on the basis of the input image and a reference image and further generates a differential image on the basis of the input image and the prediction image. The encoder can improve the compression coding efficiency by encoding the differential image without encoding the input image.

An encoder disclosed in Patent Document 1 calculates a prediction error of each image on the basis of an input image and a prediction image in order to evaluate the quality of each image. Herein, the prediction error refers to a sum of absolute differences (SAD) obtained by adding up differential absolute values of corresponding pixel values of the input image and the prediction image with respect to all the corresponding pixels. Alternatively, the prediction error refers to a sum of square differences (SSD) obtained by adding up differential square values of corresponding pixel values of the input image and the prediction image with respect to all the corresponding pixels.

When the encoder determines that the prediction error of an image to be currently encoded sharply increases, the encoder estimates that the quality of the image to be currently encoded is sharply degraded. Then, for an image to be encoded next, the encoder allocates the target amount of codes larger than that of the image to be currently encoded. Thus, the encoder can improve the quality of the image to be encoded next as compared with the quality of the image to be currently encoded. Further, the encoder can avoid an overflow of an output image buffer.

[Patent Document 1] Japanese Patent Application Laid Open Gazette No. 2002-125235

The encoder disclosed in Patent Document 1 can improve the quality of the image to be encoded next even if the quality of the image to be currently encoded is degraded. When the qualities of images in a whole stream are not uniform, however, since an image of high quality and an image of low quality alternately appear, there occurs flicker and the image quality is thereby subjectively degraded. In a whole stream having a little motion, particularly, the subjective degradation of image quality is remarkable.

DISCLOSURE OF INVENTION

The present invention is intended for an encoder for encoding an input image into an output image. According to an aspect of the present invention, the encoder comprises a quantization error calculation part for calculating a quantization error by comparing the input image with a decoded image obtained by decoding once-encoded input image, a measured quantization error storage part for storing a measured quantization error which is an actually measured value of the quantization error with respect to an encoded unit of processing which is already encoded, and a target quantization error setting part for setting a target quantization error which is a target value of the quantization error by making reference to a variation in the measured quantization errors of images in an uncoded unit of processing which is not encoded yet while reducing the variation of the images.

By the above aspect of the present invention, since the qualities of the images are uniformly set, it is possible to subjectively improve the image quality of a whole stream. Further, since the prefetch of the uncoded unit of processing is not needed, it is possible to perform real-time processing without any increase in the circuit scale of the encoder.

According to another preferred embodiment of the present invention, the encoder further comprises a target code amount setting part for setting the target amount of codes so that the target quantization error can be achieved for each of the images in the uncoded unit of processing and a quantization step value setting part for setting a quantization step value so that the target amount of codes can be achieved for each of the images in the uncoded unit of processing.

Since a quantization step value is set for each of the images in the uncoded unit of processing, it is possible to reduce the variation in the quantization errors of the images in the uncoded unit of processing.

Therefore, it is an object of the present invention to provide a technique for subjectively improving the image quality of a whole stream in an encoder for encoding an input image into an output image.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a view showing a definition of a quantization error;

FIG. 7 is a view showing the first method of uniformly setting the respective quantization errors of the images;

FIG. 8 is a view showing a second method of uniformly setting the respective quantization errors of the images; and FIG. 9 is a view showing the second method of uniformly setting the respective quantization errors of the images.

BEST MODE FOR CARRYING OUT THE INVENTION

Constituent Elements of Encoder

Figure 1:
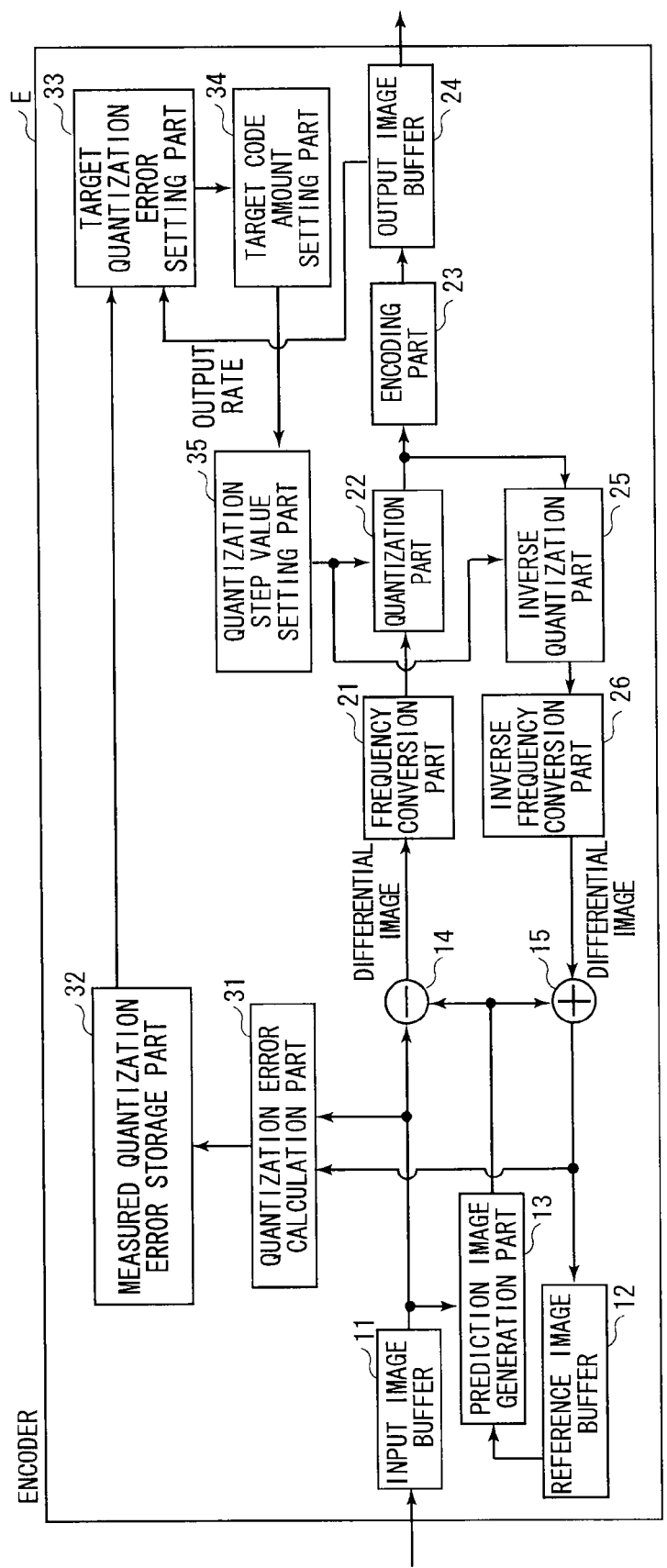
FIG. 1 is a block diagram showing constituent elements of an encoder.

Hereinafter, with reference to figures, the preferred embodiment of the present invention will be discussed. FIG. 1 is a block diagram showing constituent elements of an encoder E. The encoder E may function alone. The encoder E may be a constituent element of a transcoder or a translator and function together with a decoder. Constituent elements of the encoder E are divided into three groups.

The first group of constituent elements serves to perform prediction on an input image. The first group of constituent elements includes an input image buffer 11, a reference image buffer 12, a prediction image generation part 13, a subtracter 14, an adder 15, and the like.

The input image buffer 11 inputs an input image from the outside of the encoder E. The reference image buffer 12 inputs a reference image from the adder 15. The prediction image generation part 13 inputs the input image from the input image buffer 11 and further inputs the reference image from the reference image buffer 12. The prediction image generation part 13 generates a prediction image on the basis of the input image and the reference image.

When the prediction image generation part 13 generates a prediction image of I picture which is an intraframe prediction image, the prediction image generation part 13 determines a prediction mode. When the prediction image generation part 13 generates a prediction image of P picture which is an interframe forward prediction image or a prediction image of B picture which is an interframe bidirectional prediction image, the prediction image generation part 13 determines a motion vector.

The subtracter 14 inputs the input image from the input image buffer 11 and further inputs the prediction image from the prediction image generation part 13. The subtracter 14 subtracts the prediction image from the input image to thereby generate a differential image. The adder 15 inputs the differential image from an inverse frequency conversion part 26 and further inputs the prediction image from the prediction image generation part 13. The adder 15 adds the differential image and the prediction image to thereby generate a reference image. The operation performed by the first group of constituent elements thus takes a round.

The second group of constituent elements serves to perform encoding of the differential image. The second group of constituent elements includes a frequency conversion part 21, a quantization part 22, an encoding part 23, an output image buffer 24, an inverse quantization part 25, an inverse frequency conversion part 26, and the like.

The frequency conversion part 21 inputs the differential image from the subtracter 14 and performs frequency conversion. The quantization part 22 inputs the frequency-converted differential image from the frequency conversion part 21 and performs quantization. The encoding part 23 inputs the quantized differential image from the quantization part 22, further inputs the prediction mode or the motion vector from the prediction image generation part 13, and performs encoding. The output image buffer 24 outputs an output image to the outside of the encoder E.

The inverse quantization part 25 inputs the quantized differential image from the quantization part 22 and performs inverse quantization. The inverse frequency conversion part 26 inputs the inversely-quantized differential image from the inverse quantization part 25 and performs inverse frequency conversion. The operation performed by the second group of constituent elements thus takes a round. The differential image outputted from the inverse frequency conversion part 26 includes a quantization error due to the operations of the quantization part 22 and the inverse quantization part 25, as compared with the differential image inputted to the frequency conversion part 21.

The third group of constituent elements serves to uniformly set the respective qualities of the images. The third group of constituent elements includes a quantization error calculation part 31, a measured quantization error storage part 32, a target quantization error setting part 33, a target code amount setting part 34, a quantization step value setting part 35, and the like.

{Outline of Method of Uniformly Setting Qualities of Images}

Figure 3:
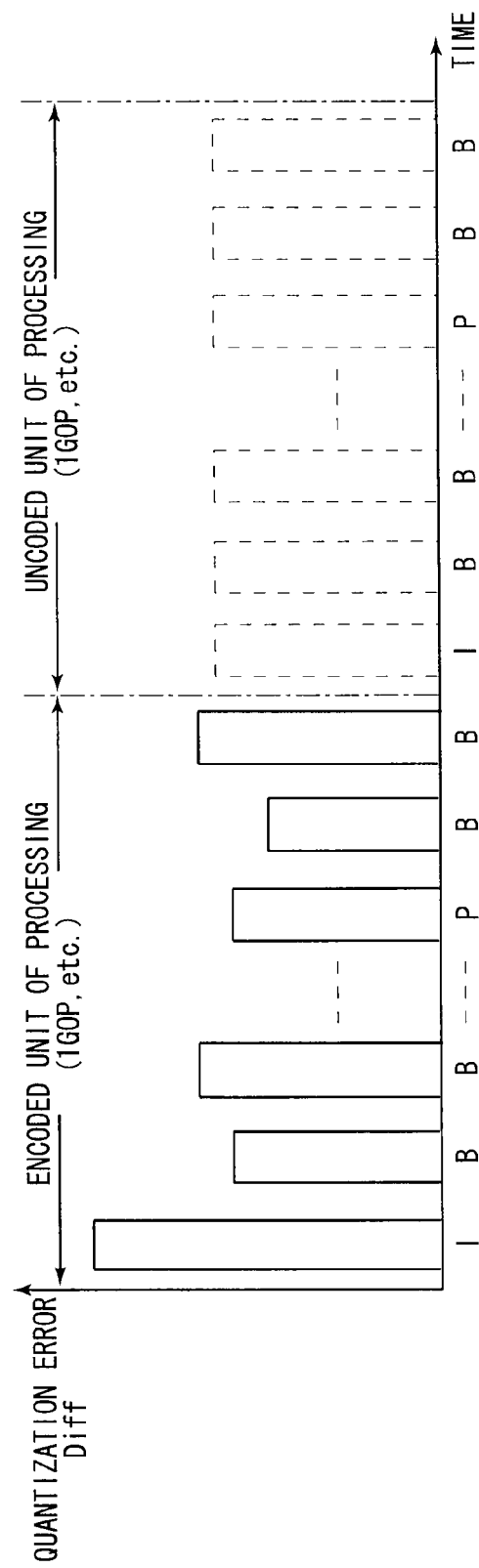
FIG. 3 is a view showing a time variation of the quantization error.
Figure 4:
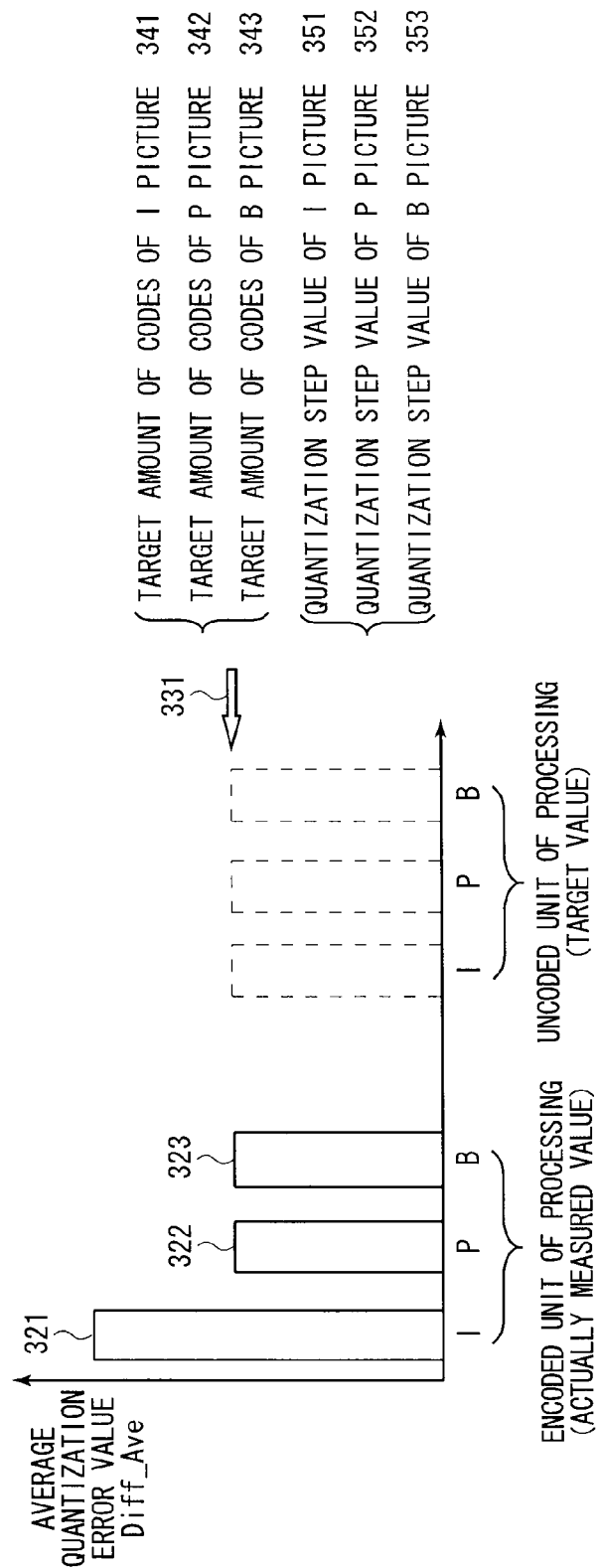
FIG. 4 is a view showing an outline of a method of uniformly setting the respective qualities of images.

An outline of a method of uniformly setting the respective qualities of images will be discussed. With reference to FIGS. 2 and 3, the quantization error calculation part 31 and the measured quantization error storage part 32 will be described. With reference to FIG. 4, the target quantization error setting part 33, the target code amount setting part 34, and the quantization step value setting part 35 will be described.

[Quantization Error Calculation Part and Measured Quantization Error Storage Part]

The quantization error calculation part 31 inputs the input image from the input image buffer 11, further inputs the reference image from the adder 15, and calculates a quantization error. The measured quantization error storage part 32 stores the quantization error of an encoded unit of processing which is already encoded. The encoded unit of processing will be described with reference to FIG. 3.

FIG. 2 is a view showing a definition of the quantization error. FIG. 2(a) shows an input image A, assuming that the image A has a size of 4×4. Reference signs A1, ..., and A16 represent pixels of the input image A and also represent respective pixel values in the input image A. FIG. 2(b) shows a decoded image B, assuming that the image B has a size of 4×4. Reference signs B1, ..., and B16 represent pixels of the decoded image B and also represent respective pixel values in the decoded image B. FIG. 2(c) shows respective definitions of the two types of quantization errors.

A definition of the first type of quantization error will be discussed. The quantization error is defined by a sum of absolute differences (SAD) obtained by adding up differential absolute values of the corresponding pixel values of the input image and the decoded image with respect to all the corresponding pixels. Specifically, as shown in the upper side of FIG. 2(c), the quantization error Diff is defined by $\Sigma |AN-BN|$. Herein, the sum is calculated for the sixteen pixels.

A definition of the second type of quantization error will be discussed. The quantization error is defined by a sum of square differences (SSD) obtained by adding up differential square values of the corresponding pixel values of the input image and the decoded image with respect to all the corresponding pixels. Specifically, as shown in the lower side of FIG. 2(c), the quantization error Diff is defined by $\Sigma (AN-BN)^2$. Herein, the sum is calculated for the sixteen pixels.

In the calculation of the quantization error by any one of the above-discussed two methods, both a luminance signal and a color difference signal of each pixel may be used. There may be a case where the quantization error with respect to the luminance signal and that with respect to the color difference signal are calculated and an average or a weighted average of these errors is obtained. Alternatively, there may be another case where either one of the luminance signal and the color difference signal is used to calculate the quantization error.

FIG. 3 is a view showing a time variation of the quantization error Diff. The vertical axis represents the quantization error Diff and the horizontal axis represents time. The characters "I", "P", and "B" below the horizontal axis represent which of the I, P, and B pictures an image to be inputted with time is.

On the left side of FIG. 3 shown is a time variation of the quantization error Diff in the encoded unit of processing which is already encoded. In this case, with respect to the encoded unit of processing, encoding is already performed in the encoding part 23 and the quantization errors Diff are already stored in the measured quantization error storage part 32. In other words, the quantization errors Diff in the encoded unit of processing are actually-measured ones and indicated by a bar chart using solid lines.

On the right side of FIG. 3 shown is a time variation of the quantization error Diff in the uncoded unit of processing which is not encoded. In this case, with respect to the uncoded unit of processing, encoding is not performed yet in the encoding part 23 and no quantization error Diff is stored yet in the measured quantization error storage part 32. In other words, the quantization errors Diff in the uncoded unit of processing are non-measured ones and indicated by a bar chart using broken lines.

In the encoded unit of processing, there is a large variation in the quantization errors Diff of the images and in other words, a large variation in the qualities of the images. With respect to the uncoded unit of processing, the target quantization error setting part 33, the target code amount setting part 34, and the quantization step value setting part 35 perform the respective operations so that the variation in the quantization errors Diff of the images may become small and in other words, the variation in the qualities of the images may become small.

A result of the encoding of the encoded unit of processing is feedback to the encoding of the uncoded unit of processing. The target quantization error setting part 33, the target code amount setting part 34, and the quantization step value setting part 35 perform the respective operations so that the variation in the qualities of the images in the uncoded unit of processing may become smaller than that in the qualities of the images in the encoded unit of processing. Further, the target quantization error setting part 33, the target code amount setting part 34, and the quantization step value setting part 35 perform the respective operations so that the variation in the qualities of images in the next uncoded unit of processing may become smaller than that in the qualities of the images in the immediately preceding uncoded unit of processing.

The encoded unit of processing and the uncoded unit of processing are arbitrary units of processing. As a first specific example, each of the encoded unit of processing and the uncoded unit of processing may be a unit of one GOP (Group of Pictures) or a plurality of (an arbitrary number of) GOPs. As a second specific example, both the encoded unit of processing and the uncoded unit of processing may be included in a unit of one GOP. Of course, an exemplary unit of processing is not limited to these specific examples.

In the first specific example, there is a large variation in the qualities of images in an already-encoded unit of one GOP or an arbitrary number of GOPs. In an uncoded unit of one GOP or an arbitrary number of GOPs, however, there is a small variation in the qualities of images. In the first specific example, it is easier than in the second specific example to uniformly set the qualities of the images.

In the second specific example, there is a large variation in the qualities of images in the first half of the unit of one GOP which is already encoded. In the latter half of the unit of one GOP which is not encoded yet, however, there is a small variation in the qualities of images. In the second specific example, it is possible to uniformly set the qualities of the images in more real time than in the first specific example.

[Target Quantization Error Setting Part, Target Code Amount Setting Part, and Quantization Step Value Setting Part]

The target quantization error setting part 33 inputs the quantization error of the encoded unit of processing from the measured quantization error storage part 32 and further inputs an output rate of the encoded unit of processing from the output image buffer 24. The target quantization error setting part 33 sets a quantization error of the uncoded unit of processing on the basis of the quantization error and the output rate of the encoded unit of processing.

The target code amount setting part 34 inputs the quantization error of the uncoded unit of processing from the target quantization error setting part 33. The target code amount setting part 34 sets the target amount of codes in the uncoded unit of processing on the basis of the quantization error of the uncoded unit of processing.

The quantization step value setting part 35 inputs the target amount of codes in the uncoded unit of processing from the target code amount setting part 34. The quantization step value setting part 35 sets a quantization step value of the uncoded unit of processing on the basis of the target amount of codes in the uncoded unit of processing.

The quantization part 22 and the inverse quantization part 25 perform quantization and inverse quantization of the uncoded unit of processing, respectively, on the basis of the quantization step value of the uncoded unit of processing.

FIG. 4 is a view showing an outline of a method of uniformly setting the respective qualities of the images. In the encoded unit of processing, an average quantization error value Diff_Ave is an average of actually measured values of respective quantization errors Diff of the I, P, B pictures. In the uncoded unit of processing, an average quantization error value Diff_Ave is an average of target values of the respective quantization errors Diff of the I, P, B pictures. As shown in FIG. 3, the actually measured values are different from the target values. The actually measured values and the target values are indicated by the bar charts using solid lines and broken lines, respectively.

The target quantization error setting part 33 calculates respective average quantization error values 321, 322, and 323 of the I, P, B pictures in the encoded unit of processing. The target quantization error setting part 33 uniformly sets the respective average quantization error values Diff_Ave of the I, P, B pictures in the uncoded unit of processing as indicated by the arrow 331.

The target code amount setting part 34 sets respective target amounts of codes 341, 342, and 343 of the I, P, B pictures in the uncoded unit of processing so that the respective average quantization error values Diff_Ave of the I, P, B pictures in the uncoded unit of processing can be achieved.

The quantization step value setting part 35 sets respective quantization step values 351, 352, and 353 of the I, P, B pictures in the uncoded unit of processing so that the respective target amounts of codes 341, 342, and 343 of the I, P, B pictures in the uncoded unit of processing can be achieved.

As the method of uniformly setting the average quantization error values Diff_Ave and the method of setting the target amounts of codes 341, 342, and 343 and the quantization step values 351, 352, and 353, a plurality of methods will be discussed with reference to FIGS. 5 to 9.

{The First Method of Uniformly Setting Quantization Errors of Images}

A first method of uniformly setting the quantization errors of the images will be discussed. The target quantization error setting part 33 compares the output rate of the encoded unit of processing with a target rate set by a user of the encoder E. The target quantization error setting part 33 uniformly sets the average quantization error values Diff_Ave in the uncoded unit of processing so that an output rate of the uncoded unit of processing can be approximated to the target rate set by the user of the encoder E.

Figure 5:
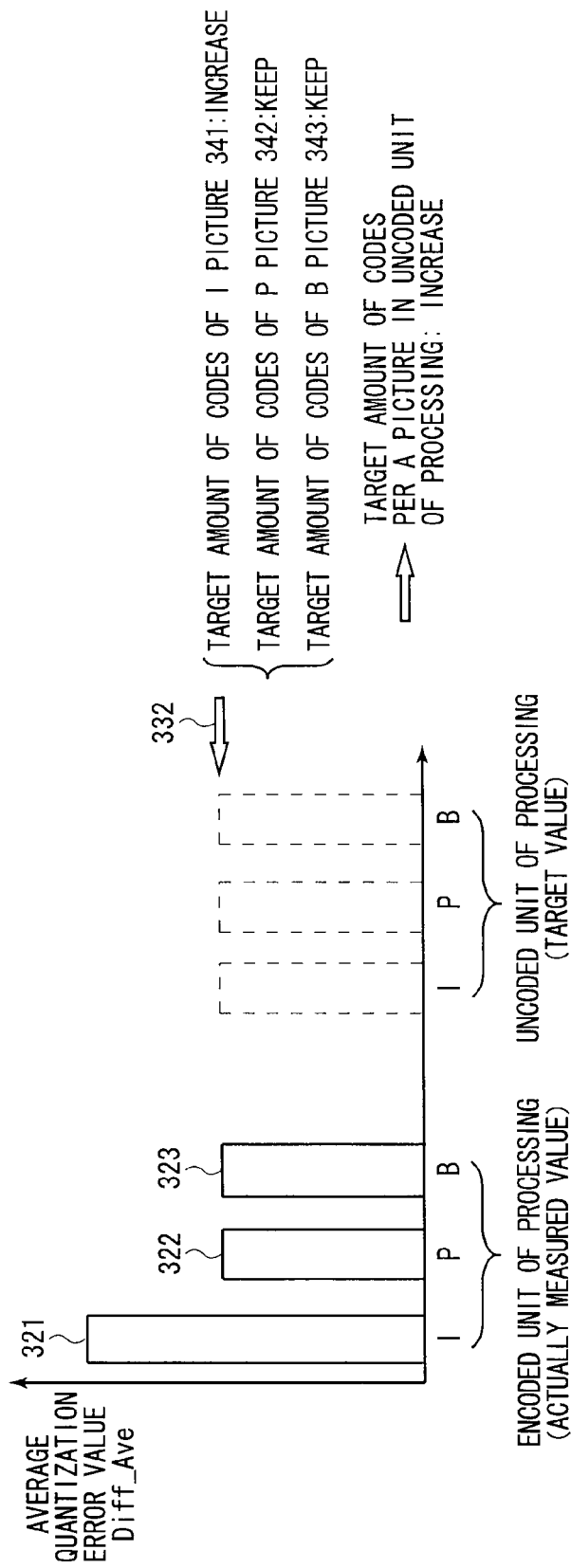
FIG. 5 is a view showing a first method of uniformly setting respective quantization errors of the images.

[Case of FIG. 5]

FIG. 5 is a view showing a method of uniformly setting the quantization errors of the images in a case where the output rate of the encoded unit of processing is lower than the target rate. In other words, the output rate of the uncoded unit of processing may be higher than the output rate of the encoded unit of processing.

The target quantization error setting part 33 calculates the respective average quantization error values 321, 322, and 323 of the I, P, B pictures in the encoded unit of processing. The target quantization error setting part 33 sets the minimum value out of the average quantization error values 321, 322, and 323 as the uniform average quantization error value Diff_Ave for the I, P, B pictures in the uncoded unit of processing as indicated by the arrow 332. It is desirable, as a matter of course, that the output rate of the uncoded unit of processing should be equal to the target rate or should not be extremely higher than the target rate.

The target quantization error setting part 33 sets the uniform average quantization error value Diff_Ave of the uncoded unit of processing to be smaller than the average quantization error value 321 of the I picture in the encoded unit of processing and to be equal to the average quantization error values 322 and 323 of the P and B pictures in the encoded unit of processing.

In order to make the quantization error smaller, it is desirable that the quantization step value should be set to be smaller and the target amount of codes should be set to be larger.

The target code amount setting part 34 increases the target amount of codes 341 of the I picture in the uncoded unit of processing to be larger than the target amount of codes of the I picture in the encoded unit of processing which is set earlier. The target code amount setting part 34 keeps the target amounts of codes 342 and 343 of the P and B pictures in the uncoded unit of processing equal to the target amounts of codes of the P and B pictures in the encoded unit of processing which are set earlier, respectively. The target code amount setting part 34 increases the target amount of codes per a picture in the uncoded unit of processing to be larger than the target amount of codes per a picture in the encoded unit of processing which is set earlier.

The quantization step value setting part 35 decreases the quantization step value 351 of the I picture in the uncoded unit of processing to be smaller than the quantization step value of the I picture in the encoded unit of processing which is set earlier. The quantization step value setting part 35 keeps the quantization step values 352 and 353 of the P and B pictures in the uncoded unit of processing equal to the quantization step values of the P and B pictures in the encoded unit of processing which are set earlier, respectively. This feedback is repeated.

The image quality of the I picture in the uncoded unit of processing becomes higher than that of the I picture in the encoded unit of processing. The respective image qualities of the P and B pictures in the uncoded unit of processing become equal to the respective image qualities of the P and B pictures in the encoded unit of processing, respectively.

The overall image quality of the uncoded unit of processing becomes higher than that of the encoded unit of processing. Further, since the qualities of the images in the uncoded unit of processing are uniformly set, no flicker is caused in the uncoded unit of processing and the image quality of the uncoded unit of processing on the whole is improved even subjectively.

Figure 6:
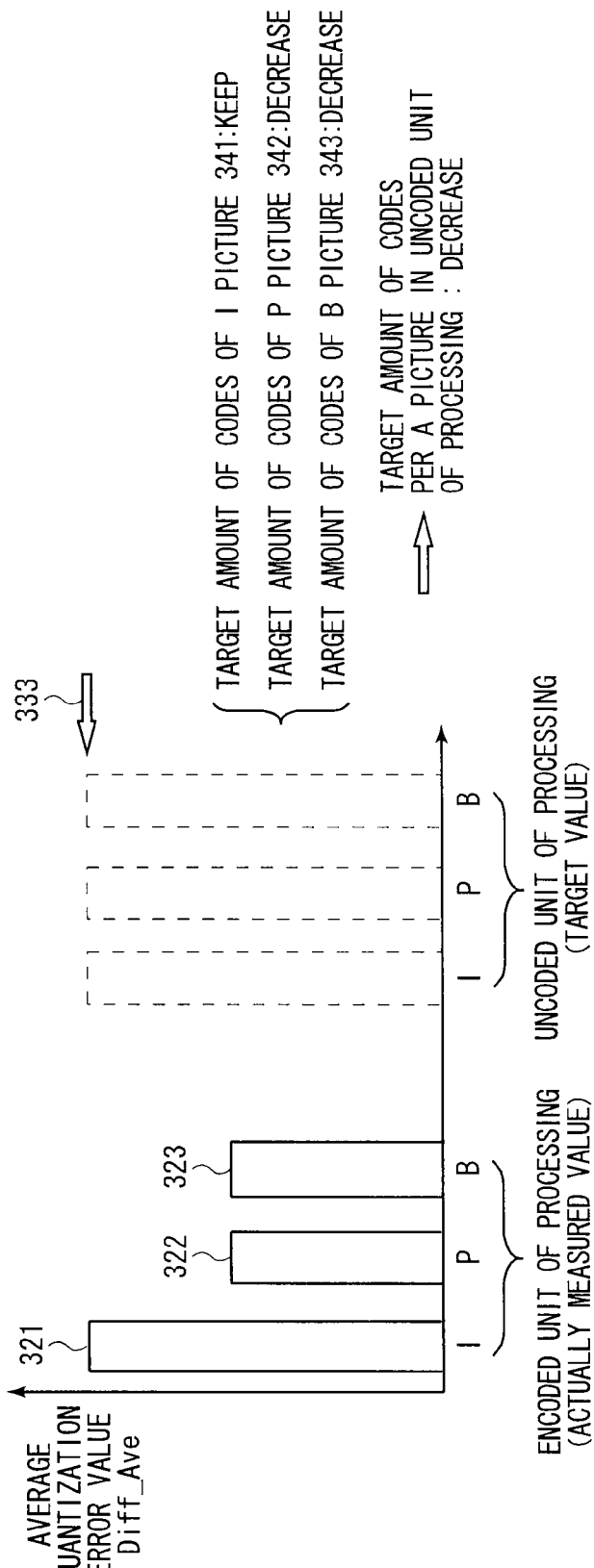
FIG. 6 is a view showing the first method of uniformly setting the respective quantization errors of the images.

[Case of FIG. 6]

FIG. 6 is a view showing a method of uniformly setting the quantization errors of the images in a case where the output rate of the encoded unit of processing is higher than the target rate. In other words, the output rate of the uncoded unit of processing has only to be lower than the output rate of the encoded unit of processing.

The target quantization error setting part 33 calculates the respective average quantization error values 321, 322, and 323 of the I, P, B pictures in the encoded unit of processing. The target quantization error setting part 33 sets the maximum value out of the average quantization error values 321, 322, and 323 as the uniform average quantization error value Diff_Ave for the I, P, B pictures in the uncoded unit of processing as indicated by the arrow 333. It is desirable, as a matter of course, that the output rate of the uncoded unit of processing should be equal to the target rate or should not be extremely lower than the target rate.

The target quantization error setting part 33 sets the uniform average quantization error value Diff_Ave of the uncoded unit of processing to be equal to the average quantization error value 321 of the I picture in the encoded unit of processing and to be larger than the average quantization error values 322 and 323 of the P and B pictures in the encoded unit of processing.

In order to make the quantization error larger, it is desirable that the quantization step value should be set to be larger and the target amount of codes should be set to be smaller.

The target code amount setting part 34 keeps the target amount of codes 341 of the I picture in the uncoded unit of processing equal to the target amount of codes of the I picture in the encoded unit of processing which is set earlier. The target code amount setting part 34 decreases the target amounts of codes 342 and 343 of the P and B pictures in the uncoded unit of processing to be smaller than the target amounts of codes of the P and B pictures in the encoded unit of processing which are set earlier, respectively. The target code amount setting part 34 decreases the target amount of codes per a picture in the uncoded unit of processing to be smaller than the target amount of codes per a picture in the encoded unit of processing which is set earlier.

The quantization step value setting part 35 keeps the quantization step value 351 of the I picture in the uncoded unit of processing equal to the quantization step value of the I picture in the encoded unit of processing which is set earlier. The quantization step value setting part 35 increases the quantization step values 352 and 353 of the P and B pictures in the uncoded unit of processing to be larger than the quantization step values of the P and B pictures in the encoded unit of processing which are set earlier, respectively. This feedback is repeated.

The image quality of the I picture in the uncoded unit of processing becomes equal to that of the I picture in the encoded unit of processing. The respective image qualities of the P and B pictures in the uncoded unit of processing become lower than the respective image qualities of the P and B pictures in the encoded unit of processing, respectively.

The individual qualities of the images in the uncoded unit of processing become lower than those of the images in the encoded unit of processing. Since the qualities of the images in the uncoded unit of processing are uniformly set, however, no flicker is caused in the uncoded unit of processing and the overall image quality of the uncoded unit of processing is improved subjectively.

[Case of FIG. 7]

FIG. 7 is a view showing a method of uniformly setting the quantization errors of the images in a case where the output rate of the encoded unit of processing is equal to the target rate. In other words, the output rate of the uncoded unit of processing has only to be equal to the output rate of the encoded unit of processing.

The target quantization error setting part 33 calculates the respective average quantization error values 321, 322, and 323 of the I, P, B pictures in the encoded unit of processing. The target quantization error setting part 33 sets the average value of the average quantization error values 321, 322, and 323 as the uniform average quantization error value Diff_Ave for the I, P, B pictures in the uncoded unit of processing as indicated by the arrow 334. It is desirable, as a matter of course, that the output rate of the uncoded unit of processing should be equal to the target rate or should not be extremely different from the target rate. Further, other than the average value of the quantization errors, a median may be selected.

The target quantization error setting part 33 sets the uniform average quantization error value Diff_Ave of the uncoded unit of processing to be smaller than the average quantization error value 321 of the I picture in the encoded unit of processing and to be larger than the average quantization error values 322 and 323 of the P and B pictures in the encoded unit of processing.

The target code amount setting part 34 increases the target amount of codes 341 of the I picture in the uncoded unit of processing to be larger than the target amount of codes of the I picture in the encoded unit of processing which is set earlier. The target code amount setting part 34 decreases the target amounts of codes 342 and 343 of the P and B pictures in the uncoded unit of processing to be smaller than the target amounts of codes of the P and B pictures in the encoded unit of processing which are set earlier, respectively. The target code amount setting part 34 keeps the target amount of codes per a picture in the uncoded unit of processing equal to the target amount of codes per a picture in the encoded unit of processing which is set earlier.

The quantization step value setting part 35 decreases the quantization step value 351 of the I picture in the uncoded unit of processing to be smaller than the quantization step value of the I picture in the encoded unit of processing which is set earlier. The quantization step value setting part 35 increases the quantization step values 352 and 353 of the P and B pictures in the uncoded unit of processing to be larger than the quantization step values of the P and B pictures in the encoded unit of processing which are set earlier, respectively. This feedback is repeated.

In common to FIGS. 5 to 7, the qualities of the images in the uncoded unit of processing are uniformly set. Therefore, no flicker is caused in the uncoded unit of processing and the overall image quality of the uncoded unit of processing is improved subjectively. In common to FIGS. 5 to 7, performed is one-pass processing in which the result of encoding of the encoded unit of processing is feedback to the encoding of the uncoded unit of processing, not two-pass processing in which the prefetch of the uncoded unit of processing is needed. For this reason, it is possible to perform real-time processing without any increase in the circuit scale.

{The Second Method of Uniformly Setting Quantization Errors of Images}

A second method of uniformly setting the quantization errors of the images will be discussed. Also in the second method, like in the first method, the target amount of codes in the uncoded unit of processing is set. In the second method, unlike in the first method, as a result of setting the target amount of codes in the uncoded unit of processing, how degree the average quantization error value of the uncoded unit of processing actually becomes is taken into consideration and how degree the amount of outputted codes in the uncoded unit of processing actually becomes is taken into consideration.

FIGS. 8 and 9 are views each showing the second method of uniformly setting the quantization errors of the images. On the left end of each of these figures, actually measured values of the average quantization error values Diff_Ave in the encoded unit of processing are indicated by a bar chart using solid lines. In the center of each of these figures, target values of the average quantization error values Diff_Ave in the uncoded unit of processing before the actual encoding are indicated by a bar chart using broken lines. On the right end of each of these figures, actually measured values of the average quantization error values Diff_Ave in the uncoded unit of processing after the actual encoding are indicated by a bar chart using solid lines.

[Case of FIG. 8]

FIG. 8 is a view showing a method of uniformly setting the quantization errors of the images in a case where the average quantization error value 321 in the I picture in the encoded unit of processing is larger than each of the average quantization error values 322 and 323 of the P and B pictures in the encoded unit of processing.

The method of uniformly setting the quantization errors of the images is almost the same as the method in the case of FIG. 5. The target quantization error setting part 33 sets the uniform average quantization error value Diff_Ave in the uncoded unit of processing to be smaller than the average quantization error value 321 of the I picture in the encoded unit of processing and to be equal to the average quantization error values 322 and 323 of the P and B pictures in the encoded unit of processing. The target value of the uniform average quantization error value Diff_Ave in the uncoded unit of processing is indicated by the arrow 335A.

As to the I picture in the uncoded unit of processing, there is a high probability that the actually measured value of the average quantization error value Diff_Ave will become equal to the target value of the average quantization error value Dar_Ave.

There is a high probability that the amount of outputted codes of the I picture in the uncoded unit of processing will become larger than the amount of outputted codes of the I picture in the encoded unit of processing. These probabilities are clear from the case of FIG. 5.

As to the P and B pictures in the uncoded unit of processing, there is a probability that the actually measured value of the average quantization error value Diff_Ave will become smaller than the target value of the average quantization error value Diff_Ave. There is a probability that the amount of outputted codes of each of the P and B pictures in the uncoded unit of processing will become smaller than the amount of outputted codes of each of the P and B pictures in the encoded unit of processing. The actually measured value of the average quantization error value Diff_Ave of each of the P and B pictures in the uncoded unit of processing is indicated by the arrow 335B. These probabilities are not clear from the case of FIG. 5 and the reason for these probabilities will be discussed below.

In the uncoded unit of processing, there are P and B pictures which make reference to the I picture and there are P and B pictures which makes reference to the P picture which has made reference to the I picture. In the case of FIG. 5, in the uncoded unit of processing, the effect of the quantization error of the I picture produced on the quantization errors of the P and B pictures is not taken into consideration. In the case of FIG. 8, however, in the uncoded unit of processing, the effect of the quantization error of the I picture produced on the quantization errors of the P and B pictures is taken into consideration.

If the quantization error of the I picture is small, the quantization errors of the P and B pictures which make reference to the I picture are also small. If the quantization error of the P picture which has made reference to the I picture is small, the quantization errors of the P and B pictures which make reference to the P picture which has made reference to the I picture are also small.

Then, there is a probability that the measured quantization error values of the P and B pictures in the uncoded unit of processing will become smaller than the target quantization error values of the P and B pictures in the uncoded unit of processing. Further, there is a probability that the respective amounts of outputted codes of the P and B pictures in the uncoded unit of processing will become smaller than the respective target amounts of codes of the P and B pictures in the uncoded unit of processing. In other words, the probabilities discussed first exist.

There is a high probability that the amount of outputted codes of the I picture will increase as the process goes from the encoding of the encoded unit of processing to the encoding of the uncoded unit of processing. There is a probability that the respective amounts of outputted codes of the P and B pictures will decrease as the process goes from the encoding of the encoded unit of processing to the encoding of the uncoded unit of processing. If the degree of decrease in the amounts of outputted codes of the P and B pictures is higher than the degree of increase in the amount of outputted codes of the I picture, the amount of outputted codes per a picture in the uncoded unit of processing can become smaller than the amount of outputted codes per a picture in the encoded unit of processing.

[Case of FIG. 9]

FIG. 9 is a view showing a method of uniformly setting the quantization errors of the images in a case where the average quantization error value 321 in the I picture in the encoded unit of processing is smaller than each of the average quantization error values 322 and 323 of the P and B pictures in the encoded unit of processing.

The method of uniformly setting the quantization errors of the images is almost the same as the method in the case of FIG. 6. The target quantization error setting part 33 sets the uniform average quantization error value Diff_Ave in the uncoded unit of processing to be larger than the average quantization error value 321 of the I picture in the encoded unit of processing and to be equal to the average quantization error values 322 and 323 of the P and B pictures in the encoded unit of processing. The target value of the uniform average quantization error value Diff_Ave in the uncoded unit of processing is indicated by the arrow 336A.

As to the I picture in the uncoded unit of processing, there is a high probability that the actually measured value of the average quantization error value Diff_Ave will become equal to the target value of the average quantization error value Diff_Ave. There is a high probability that the amount of outputted codes of the I picture in the uncoded unit of processing will become smaller than the amount of outputted codes of the I picture in the encoded unit of processing. These probabilities are clear from the case of FIG. 6.

As to the P and B pictures in the uncoded unit of processing, there is a probability that the actually measured value of the average quantization error value Diff_Ave will become larger than the target value of the average quantization error value Diff_Ave. There is a probability that the amount of outputted codes of each of the P and B pictures in the uncoded unit of processing will become larger than the amount of outputted codes of each of the P and B pictures in the encoded unit of processing. The actually measured value of the average quantization error value Diff_Ave of each of the P and B pictures in the uncoded unit of processing is indicated by the arrow 336B. These probabilities are not clear from the case of FIG. 6 but become clear when a case reverse to the case of FIG. 8 is considered.

There is a high probability that the amount of outputted codes of the I picture will decrease as the process goes from the encoding of the encoded unit of processing to the encoding of the uncoded unit of processing. There is a probability that the respective amounts of outputted codes of the P and B pictures will increase as the process goes from the encoding of the encoded unit of processing to the encoding of the uncoded unit of processing. If the degree of decrease in the amount of outputted codes of the I picture is higher than the degree of increase in the amounts of outputted codes of the P and B pictures, the amount of outputted codes per a picture in the uncoded unit of processing can become smaller than the amount of outputted codes per a picture in the encoded unit of processing.

While the invention has been shown and described in detail, the foregoing description is in all aspects illustrative and not restrictive. It is therefore understood that numerous modifications and variations can be devised without departing from the scope of the invention.

The invention claimed is:

1. An encoder for encoding an input image into an output data, comprising:
   a quantization error calculation part configured to calculate a quantization error by comparing said input image with a decoded image obtained through decoding encoded data obtained through encoding said input image;
   a measured quantization error storage part configured to store measured quantization errors which are actually measured values of said quantization errors with respect to an encoded unit of processing which is already encoded; and
   a target quantization error setting part configured to set target quantization errors for images in an uncoded unit of processing which has not been encoded, the target quantization errors being target values of said quantization errors, the target quantization errors set by using a variation in said measured quantization errors of images in said encoded unit of processing in a manner that a variation in said measured quantization errors of images in said uncoded unit of processing is smaller than said variation in said measured quantization errors of images in said encoded unit of processing.

2. The encoder according to claim 1, further comprising:
   a target code amount setting part configured to set the target amount of codes so that said target quantization errors are achieved for each of said images in said uncoded unit of processing; and
   a quantization step value setting part configured to set a quantization step value so that said target amount of codes is achieved for each of said images in said uncoded unit of processing.

3. The encoder according to claim 1, wherein said target quantization error setting part includes a rate adjustment part configured to set said target quantization error by comparing a target rate with an output rate of said encoded unit of processing so that an output rate of said uncoded unit of processing is approximated to said target rate.

4. The encoder according to claim 1, wherein said target quantization error setting part includes a minimum error selection part configured to select a minimum value among said respective measured quantization errors of said images in said encoded unit of processing to set said selected minimum value as said target quantization error of each of said images in said uncoded unit of processing.

5. The encoder according to claim 1, wherein said target quantization error setting part includes a maximum error selection part configured to select a maximum value among said respective measured quantization errors of said images in said encoded unit of processing to set said selected maximum value as said target quantization error of each of said images in said uncoded unit of processing.

6. The encoder according to claim 1, wherein said target quantization error setting part includes an average error selection part configured to calculate an average value of said respective measured quantization errors of said images in said encoded unit of processing to set said average value as said target quantization error of each of said images in said uncoded unit of processing.

7. The encoder according to claim 1, wherein each of said encoded unit of processing and said uncoded unit of processing corresponds to a unit of one or a plurality of GOP(s) (Group(s) of Pictures).

8. The encoder according to claim 1, wherein each of said measured quantization error and said target quantization error includes an image type quantization error which is calculated by comparing said input image with said decoded image with respect to each of image types of an intraframe prediction image, an interframe forward prediction image, and an interframe bidirectional prediction image.

9. The encoder according to claim 1, wherein each of said measured quantization error and said target quantization error includes a sum of absolute differences obtained by adding up differential absolute values of corresponding pixel values of said input image and said decoded image with respect to all corresponding pixels.

10. The encoder according to claim 1, wherein each of said measured quantization error and said target quantization error includes a sum of square differences obtained by adding up differential square values of corresponding pixel values of said input image and said decoded image with respect to all corresponding pixels.

* * * * *